United States Patent
Hong et al.

(12)

(10) Patent No.: US 10,205,370 B2
(45) Date of Patent: Feb. 12, 2019

(54) LINEAR COMPRESSOR AND LINEAR MOTOR

(71) Applicant: LG ELECTRONICS INC., Seoul (KR)

(72) Inventors: Eonpyo Hong, Seoul (KR); Wonhyun Jung, Seoul (KR); Jeonguk Byun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 599 days.

(21) Appl. No.: 14/792,785

(22) Filed: Jul. 7, 2015

(65) Prior Publication Data

US 2016/0006331 A1    Jan. 7, 2016

(30) Foreign Application Priority Data

Jul. 7, 2014   (KR) .................. 10-2014-0084531

(51) Int. Cl.
| | |
|---|---|
| *H02K 33/16* | (2006.01) |
| *H02K 33/00* | (2006.01) |
| *F04B 35/04* | (2006.01) |
| *F04B 39/12* | (2006.01) |
| *H02K 33/12* | (2006.01) |
| *H02K 1/14* | (2006.01) |

(52) U.S. Cl.
CPC .......... *H02K 33/00* (2013.01); *F04B 35/045* (2013.01); *F04B 39/122* (2013.01); *H02K 1/145* (2013.01); *H02K 33/12* (2013.01); *H02K 2213/03* (2013.01)

(58) Field of Classification Search
CPC ......... H02K 33/00; H02K 33/16; H02K 1/145
See application file for complete search history.

(56) References Cited

U.S. PATENT DOCUMENTS

| | | | | |
|---|---|---|---|---|
| 6,956,306 | B2 * | 10/2005 | Yumita | ................. F04B 17/042 310/12.01 |
| 8,419,389 | B2 * | 4/2013 | Kang | .................... F04B 35/045 310/12.01 |

(Continued)

FOREIGN PATENT DOCUMENTS

| | | |
|---|---|---|
| CN | 1354551 | 6/2002 |
| CN | 1435569 | 8/2003 |

(Continued)

OTHER PUBLICATIONS

Chinese Office Action dated Feb. 20, 2017.

(Continued)

*Primary Examiner* — Dang Le
(74) *Attorney, Agent, or Firm* — KED & Associates LLP

(57) ABSTRACT

A linear compressor and a linear motor are provided. The linear motor may include a first stator, a second stator spaced apart from the first stator, and a permanent magnet disposed to be movable in a first direction between the first and second stators. The first stator may include a bobbin with a coil wound thereon, and a stator core that surrounds the bobbin. The stator core may be located between the second stator and the coil and may include first and second magnetic poles spaced apart from each other. One portion or entire portions of each of the first and second magnetic poles may have a constant magnetic path width within a range of a movement trajectory of the permanent magnet.

18 Claims, 7 Drawing Sheets

(56) References Cited

U.S. PATENT DOCUMENTS

2005/0281691 A1* 12/2005 Lee ............... F04B 35/045
                   417/417
2007/0108850 A1  5/2007 Chertok

FOREIGN PATENT DOCUMENTS

| | | |
|---|---|---|
| CN | 1573096 | 2/2005 |
| CN | 1658481 | 8/2005 |
| CN | 1667272 | 9/2005 |
| CN | 1699750 | 11/2005 |
| CN | 1734899 | 2/2006 |
| CN | 101835981 | 9/2010 |
| KR | 10-2004-0095540 | 11/2004 |
| KR | 10-2006-0064299 | 6/2006 |

OTHER PUBLICATIONS

European Search Report dated Apr. 18, 2016.
XP002756290; "The Characteristics of LGE Linear Oscillating Motor"; Jeong, Sangsub et al.; Jul. 15, 2010; pp. 1-6; International Compressor Engineering Conference; http:/ /docs.lib.purdue.edu. icec/1977.

* cited by examiner

LINEAR COMPRESSOR AND LINEAR MOTOR

CROSS-REFERENCE TO RELATED APPLICATION(S)

The present application claims priority under 35 U.S.C. 119 and 35 U.S.C. 365 to Korean Patent Application No. 10-2014-0084531, filed in Korea on Jul. 7, 2014, which is hereby incorporated by reference in its entirety.

BACKGROUND

1. Field

A linear compressor and a linear motor are disclosed herein.

2. Background

In general, compressors are mechanical apparatuses that compress and raise a pressure of air, a refrigerant, or various other operating gases, by receiving power from power generating apparatuses, such as electric motors or turbines, and may be widely used in electric home appliances, such as refrigerators and air conditioners, and in most industries. Compressors are roughly classified into reciprocating compressors, in which a compression space into which and from which an operating gas, such as a refrigerant, is suctioned and discharged, is formed between a piston and a cylinder, and in which the piston is linearly reciprocated inside of the cylinder to compress the working gas; rotary compressors, in which a compression space into and from which an operating gas, such as a refrigerant, is suctioned and discharged, is formed between an eccentrically-rotated roller and a cylinder, and in which the roller is eccentrically rotated along an inner wall of the cylinder to compress the working gas; and a scroll compressor, in which a compression space into and from which an operating gas, such as a refrigerant, is suctioned and discharged, is formed between an orbiting scroll and a fixed scroll, and in which the orbiting scroll is rotated with respect the fixed scroll to compress the working gas.

Recently, among reciprocating compressors, linear compressors that linearly reciprocate pistons, have simple structures, can improve compression efficiency, and are not subject to mechanical loss resulting from motion conversion, have been developed in many forms. Generally, a linear compressor is configured to suction and compress a refrigerant while a piston is linearly reciprocated within a cylinder by a linear motor in a sealed shell, and discharge the compressed refrigerant.

FIG. 1A is a schematic diagram of a linear motor for a linear compressor according to the conventional art. Referring to FIG. 1A, a conventional linear motor 1 may include an outer stator 10, an inner stator 20, and a permanent magnet 30 movable between the outer stator 10 and the inner stator 20. The outer stator 10 may surround a bobbin 16 having a coil 15 wound thereon.

The outer stator 10 may include a first core 11 that extends in a moving direction of the permanent magnet 30, that is, a direction substantially parallel to an axial direction; a plurality of second cores 12 that extends from both ends of the first core 11 in a direction substantially perpendicular to the axial direction; and a plurality of magnetic poles 13 that extends from each of the plurality of second cores 12, respectively, in directions such that they extend closer to each other. The plurality of magnetic poles 13 has sectional areas in the axial direction that become progressively smaller as they extend closer to each other.

Recently, technology providing a more linear compressor has been developed. Manufacturing of a linear motor may be considered a technique for making a linear compressor more compact.

In conventional linear motors, to reduce an outer diameter Dm of the linear motor while maintaining a total cross-sectional area of the coil wound on the bobbin, a reduction of the outer diameter Dm of the linear motor by reducing widths of the plurality of magnetic poles may be considered.

FIG. 1B is a graph illustrating width of a magnetic pole and a motor force constant when the width of a magnetic pole is reduced. Referring to FIG. 1B, the motor force constant denotes a magnitude of back electromotive force induced in the coil when the permanent magnet is moved by a predetermined distance from an outer end portion of one magnetic pole of the outer stator to an outer end portion of the other magnetic pole within a range of a movable trajectory X. As the motor force constant within the range of the movable trajectory becomes greater, and as a slope becomes constant, efficiency and output of the motor improves.

When a width w of the magnetic pole 13 is reduced to w', saturation becomes stronger at inner end portions 14 of the plurality of magnetic poles 13 which are within the range of the movable trajectory X of the permanent magnet 30, and the motor force constant becomes smaller. The inner end portions 14 of the plurality of magnetic poles 13 are ends of portions adjacent to each other at each of the magnetic poles.

Also, the motor force constant rapidly decreases at outer end portions (an end portion of a portion adjacent to the second core 12 at each of the magnetic poles) of the plurality of magnetic poles 13. Thus, a slope of the motor force constant becomes larger and a decrease in efficiency and output of the motor may occur.

BRIEF DESCRIPTION OF THE DRAWINGS

Embodiments will be described in detail with reference to the following drawings in which like reference numerals refer to like elements, and wherein.

DETAILED DESCRIPTION

Figure 1A:
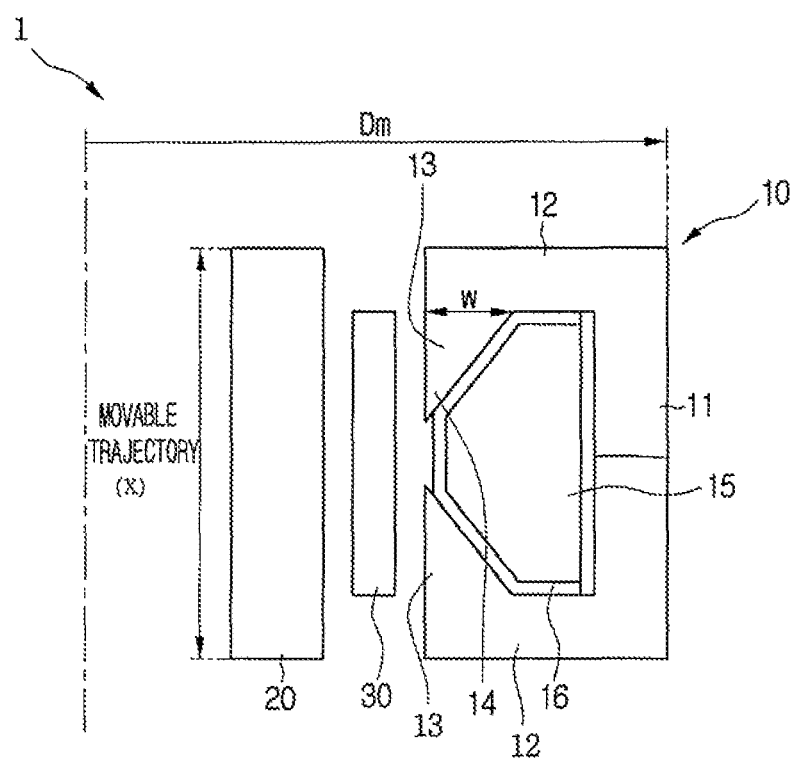
FIG. 1A is a schematic diagram of a linear motor for a linear compressor according to the conventional art.
Figure 1B:
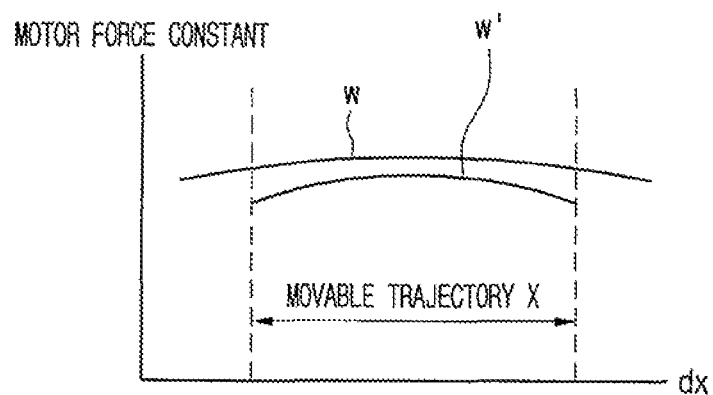
FIG. 1B is a graph illustrating a magnetic pole width and a motor force constant when a width of the magnetic pole is reduced.

Reference will now be made in detail to the embodiments, examples of which are illustrated in the accompanying drawings. Where possible, like reference numerals have been used to indicate like elements, and repetitive disclosure has been omitted.

In the following detailed description of embodiments, reference is made to the accompanying drawings that form a part hereof, and in which is shown by way of illustration specific embodiments which may be practiced. These embodiments are described in sufficient detail to enable those skilled in the art to practice the embodiments, and it is understood that other embodiments may be utilized and that logical structural, mechanical, electrical, and chemical changes may be made without departing from the spirit or scope. To avoid detail not necessary to enable those skilled in the art to practice the embodiments, the description may omit certain information known to those skilled in the art. The following detailed description is, therefore, not to be taken in a limiting sense.

Also, in the description of embodiments, terms such as first, second, A, B, (a), (b) or the like may be used herein when describing components. Each of these terminologies is not used to define an essence, order or sequence of a corresponding component but used merely to distinguish the corresponding component from other component(s). It should be noted that if it is described in the specification that one component is "connected," "coupled" or "joined" to another component, the former may be directly "connected," "coupled," and "joined" to the latter or "connected", "coupled", and "joined" to the latter via another component.

Figure 2:
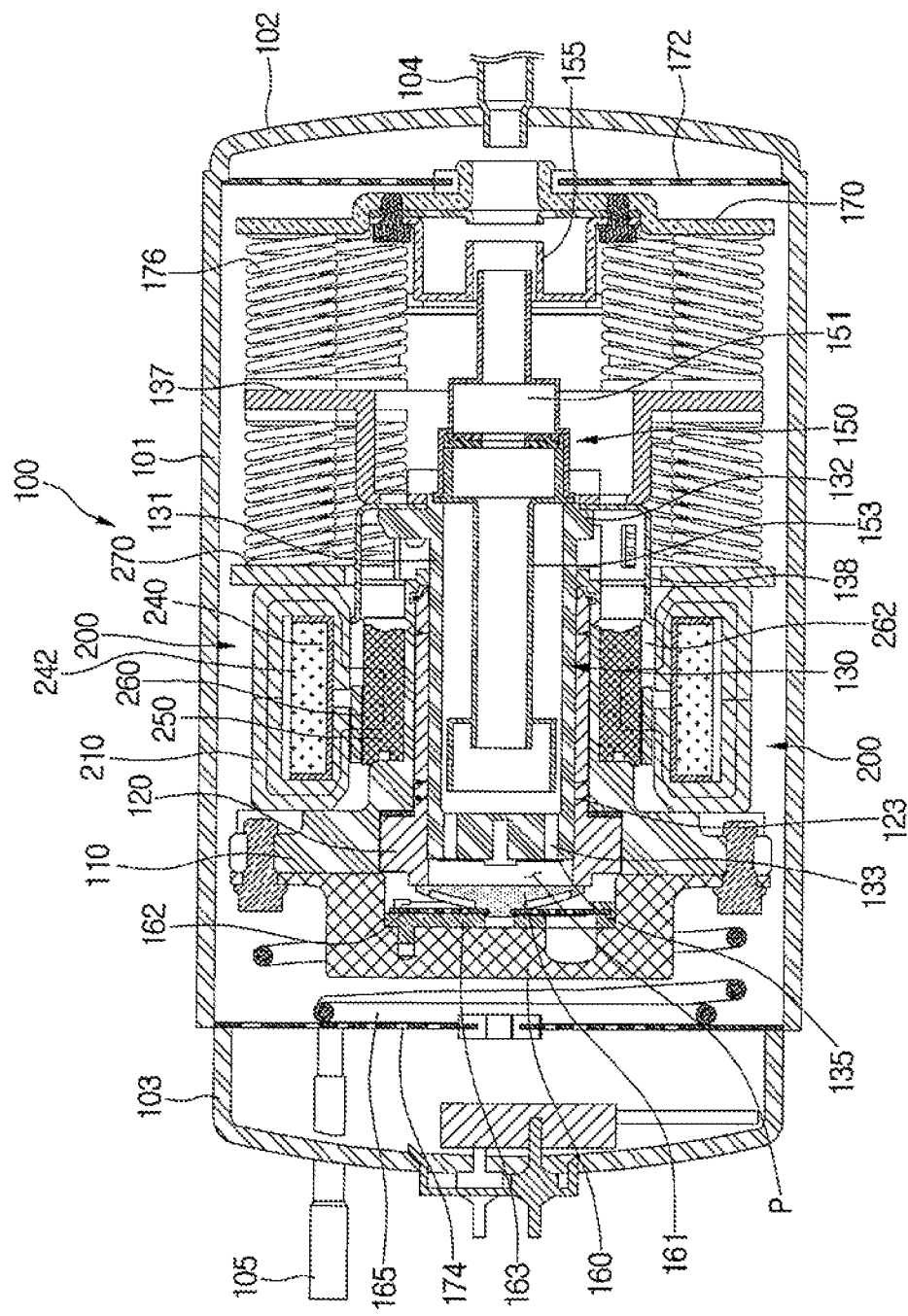
FIG. 2 is a cross-sectional view of a linear compressor according to an embodiment.

FIG. 2 is a cross-sectional view illustrating a linear compressor according to an embodiment. Referring to FIG. 2, a linear compressor 100 according to an embodiment may include a shell 101 with an approximately cylindrical shape, a first cover 102 coupled to a first side of the shell 101, and a second cover 103 coupled to a second side of the shell 101. For example, the linear compressor 100 may be installed on a product in a state in which it is laid out in a longitudinal direction, the first cover 102 may be located at a right side of the shell 101, and the second cover 103 may be located at a left side of the shell 101. In a broad sense, the first and second covers 102 and 103 may be understood as components of the shell 101.

The linear compressor 100 may further include a cylinder 120 provided inside of the shell 101, a piston 130 that linearly reciprocates inside of the cylinder 120, and a linear motor 200 that provides a drive power to the piston 130. When the linear motor 200 is driven, the piston 130 may reciprocate at a high speed. An operation frequency of the linear compressor 100 according to an embodiment may be about 100 Hz, for example.

The linear compressor 100 may further include a suction port 104, into which a refrigerant may be introduced, and a discharge port 105, through which a refrigerant compressed inside of the cylinder 120 may be discharged. The suction port 104 may be coupled to the first cover 102, and the discharge port 105 may be coupled to the second cover 103.

The refrigerant suctioned in through the suction port 104 may flow into the piston 130 through a suction muffler 150. Noise may be reduced while the refrigerant passes through the suction muffler 150. The suction muffler 150 may include a first muffler 151, and a second muffler 153 coupled to the first muffler 151. At least a portion of the suction muffler 150 may be located inside of the piston 130.

The piston 130 may include a piston body 131 having an approximately cylindrical shape, and a piston flange 132 that extends from the piston body 131 in a radial direction. The piston body 131 may reciprocate inside of the cylinder 120, and the piston flange 132 may reciprocate outside of the cylinder 120.

The piston 130 may be formed of a nonmagnetic material, such as an aluminum-based material, such as aluminum or aluminum alloy. As the piston 130 may be made of the aluminum-based material, magnetic flux generated in the linear motor 200 may be delivered to the piston 130, thereby preventing the magnetic flux from leaking outside of the piston 130. The piston 130 may be formed by forging, for example; however, embodiments are not limited thereto.

The cylinder 120 may be formed of a nonmagnetic material, such as an aluminum-based material, such as aluminum or aluminum alloy. The cylinder 120 and the piston 130 may have a same material composition ratio, that is, a same material type and composition ratio. As the cylinder 120 may be formed of the aluminum-based material, magnetic flux generated in the linear motor 200 may be delivered to the cylinder 120, thereby preventing the magnetic flux from leaking outside of the cylinder 120. The cylinder 120 may be formed by extruded rod processing, for example; however, embodiments are limited thereto.

The piston 130 and the cylinder 120 may be formed of a same material (aluminum), and thus, may have a same thermal expansion coefficient. During operation of the linear compressor 100, a high-temperature environment (about 100 ⏹) may be formed inside of the shell 100. The piston 130 and the cylinder 120 may have a same thermal expansion coefficient, and thus, may have a same amount of thermal deformation. As a result, interference occurring between the piston 130 and the cylinder 120 during movement of the piston 130 because the piston 130 and the cylinder 120 are thermally deformed in different amounts or directions, may be prevented.

The cylinder 120 may accommodate at least a portion of the suction muffler 150 and at least a portion of the piston 130. A compression space P, in which the refrigerant may be compressed by means of the piston 130, may be defined in the cylinder 120. Also, a suction hole 133, through which the refrigerant may be introduced into the compression space P, may be formed in or at a front side of the piston 130, and a suction valve 135 to selectively open the suction hole 133 may be disposed at a front side of the suction hole 133. A fastening hole, to which a predetermined fastening member may be coupled, may be formed at an approximately central portion of the suction valve 135.

A discharge cover 160, in which a discharge space or discharge flow path of the refrigerant discharged from the compression space P may be defined, and a discharge valve assembly 161, 162, and 163 coupled to the discharge cover 160 to selectively discharge the refrigerant compressed in the compression space P, may be disposed at a front side of the compression space P. The discharge valve assembly 161, 162, and 163 may include a discharge valve 161, which may be opened to introduce the refrigerant into the discharge space of the discharge cover 160 when a pressure of the compression space P is not less than a discharge pressure; a valve spring 162, which may be disposed between the discharge valve 161 and the discharge cover 160 to exert an elastic force in an axial direction; and a stopper 163, which may limit a deformation amount of the valve spring 162.

The compression space P may be a space formed between the suction valve 135 and the discharge valve 161. The suction valve 135 may be disposed at a first side or end of the compression space P, and the discharge valve 161 may be disposed at a second side or end of the compression space P, that is, at an opposite side to the suction valve 135. The discharge valve 161 may be movably disposed at a front end of the cylinder 120.

The term "axial direction" used herein may refer to a direction in which the piston 130 reciprocates or a direction in which a permanent magnet reciprocates. Also, in the axial direction, a direction from the suction port 104 to the discharge port 105, that is, a flow direction of the refrigerant, may be referred to as a "frontward direction", and the opposite direction may be referred to as a "rearward direction". Conversely, the term "radial direction" may refer to a direction substantially perpendicular to a reciprocating direction of the piston 130.

The stopper 163 may be positioned on the discharge cover 160, and the valve spring 162 may be positioned at a rear side of the stopper 163. Also, the discharge valve 161 may be coupled to the valve spring 162, and a rear side or a rear surface of the discharge valve 161 may be positioned to be supported by a front surface of the cylinder 120. The valve spring 162 may include, for example, a plate spring.

While the piston 130 linearly reciprocates inside of the cylinder 120, the suction valve 135 may be opened to allow the refrigerant to be introduced into the compression space P when the pressure of the compression space P is lower than the discharge pressure and not greater than a suction pressure. Conversely, when the pressure of the compression space P is not less than the suction pressure, the refrigerant in the compression space P may be compressed in a state in which the suction valve 135 is closed. When the pressure of the compression space P is the discharge pressure or greater, the valve spring 162 may be deformed to open the discharge valve 161, and the refrigerant may be discharged from the compression space P to a discharge space of the discharge cover 160.

The refrigerant flowing in the discharge space of the discharge cover 160 may flow into a loop pipe 165. The loop pipe 165 may be coupled to the discharge cover 160, extend to the discharge port 105, and guide the compressed refrigerant in the discharge space to the discharge port 105. For example, the loop pipe 165 may have a shape wound in a predetermined direction and curvedly extend to be coupled to the discharge port 105.

The linear compressor 100 may further include a frame 110 coupled to an outer side of the cylinder 120. The frame 110, configured to fix the cylinder 120, may be coupled to the cylinder 120 by a separate fastening member, for example. The frame 110 may be disposed to surround the cylinder 120. That is, the cylinder 120 may be accommodated inside of the frame 110. The discharge cover 160 may be coupled to a front surface of the frame 110.

At least a portion of the gas refrigerant, from high-pressure gas refrigerant discharged through the opened discharge valve 161, may flow to an outer circumferential surface of the cylinder 120 through a space at which the cylinder 120 and the frame 110 are coupled. The refrigerant may be introduced into the cylinder 120 through at least one nozzle 123 formed on the cylinder 120. The introduced refrigerant may flow to a space between the piston 130 and the cylinder 120, and allow an outer circumferential surface of the piston 130 to be spaced apart from an inner circumferential surface of the cylinder 120. Accordingly, the introduced refrigerant may function as a gas bearing reducing friction between the piston 130 and the cylinder 120 during a reciprocating motion of the piston 130.

The linear motor 200 may include a first stator 210 disposed to surround the cylinder 120, a second stator 250 disposed to be spaced apart from the first stator 210, and a permanent magnet 260 located in a space between the first stator 210 and the second stator 250. Any one of the first stator 210 and the second stator 250 may be an outer stator and the other may be an inner stator. For example, it is illustrated in FIG. 2 that the first stator 210 is an outer stator, and the second stator 250 is an inner stator.

The permanent magnet 260 may linearly reciprocate due to a mutual electromagnetic force between the first stator 210 and the second stator 250. The permanent magnet 260 may include a single magnet having one pole, or multiple magnets having three poles. A plurality of the permanent magnet 280 may be disposed at an outer side of the second stator 250.

The permanent magnet 260 may be coupled to the piston 130 by a connection member 138, for example. More specifically, the connection member 138 may be coupled to the piston flange 132 and extend to be bent toward the permanent magnet 260. As the permanent magnet 260 reciprocates, the piston 130 may be reciprocated in the axial direction along with the permanent magnet 260 by the connection member 138.

The linear motor 200 may further include a fixation member 262 to fix the permanent magnet 260 to the connection member 138. The fixation member 262 may be formed of glass fiber or carbon fiber mixed with resin, for example. The fixation member 262 may be provided to surround inner and outer sides of the permanent magnet 260 and firmly maintain a coupled state of the permanent magnet 260 and the connection member 138.

The first stator 210 may include a coil winding assembly 240 and 242, and a plurality of stator cores 211 disposed at predetermined intervals in a circumferential direction of the coil winding assembly 240 and 242. Each of the plurality of stator cores 211 may include a first core block 212, and a second core block 220. Each of the first and second core blocks 212 and 220 may be formed by stacking a plurality of laminations in a circumferential direction and may be disposed to surround the coil winding assembly 240 and 242.

The coil winding assembly 240 and 242 may include a bobbin 240, and a coil 242 wound in a circumferential direction of the bobbin 240. The coil 242 may have a polygonal cross section, such as a hexagonal section.

The linear compressor 100 may further include a supporter 137, which may support the piston 130, and a back cover 170 disposed at one side of and apart from the supporter 137 and coupled to the supporter 137 by a spring, for example. The supporter 137 may be coupled to the piston flange 132 and the connection member 138 by a predetermined fastening member, for example.

A suction guide 155 may be coupled to a front side of the back cover 170. The suction guide 155 may guide the refrigerant suctioned through the suction port 104 to be introduced into the suction muffler 150.

The linear compressor 100 may further include a plurality of springs 176, each of which may have a natural frequency which may be adjusted so as to allow the piston 130 to perform a resonant motion. The plurality of springs 176 may include one or more first spring supported between the supporter 137 and a stator cover 270, and one or more second spring supported between the supporter 137 and the back cover 170.

The linear compressor 100 may further include plate springs 172 and 174 disposed at both sides of the shell 101 that allow internal components of the compressor 100 to be supported by the shell 101. The plate springs 172 and 174 may include a first plate spring 172 coupled to the first cover 102, and a second plate spring 174 coupled to the second cover 103. For example, the first plate spring 172 may be inserted into a portion at which the shell 101 and the first cover 102 are coupled, and the second plate spring 174 may be inserted into a portion at which the shell 101 and the second cover 103 are coupled.

Figure 3:
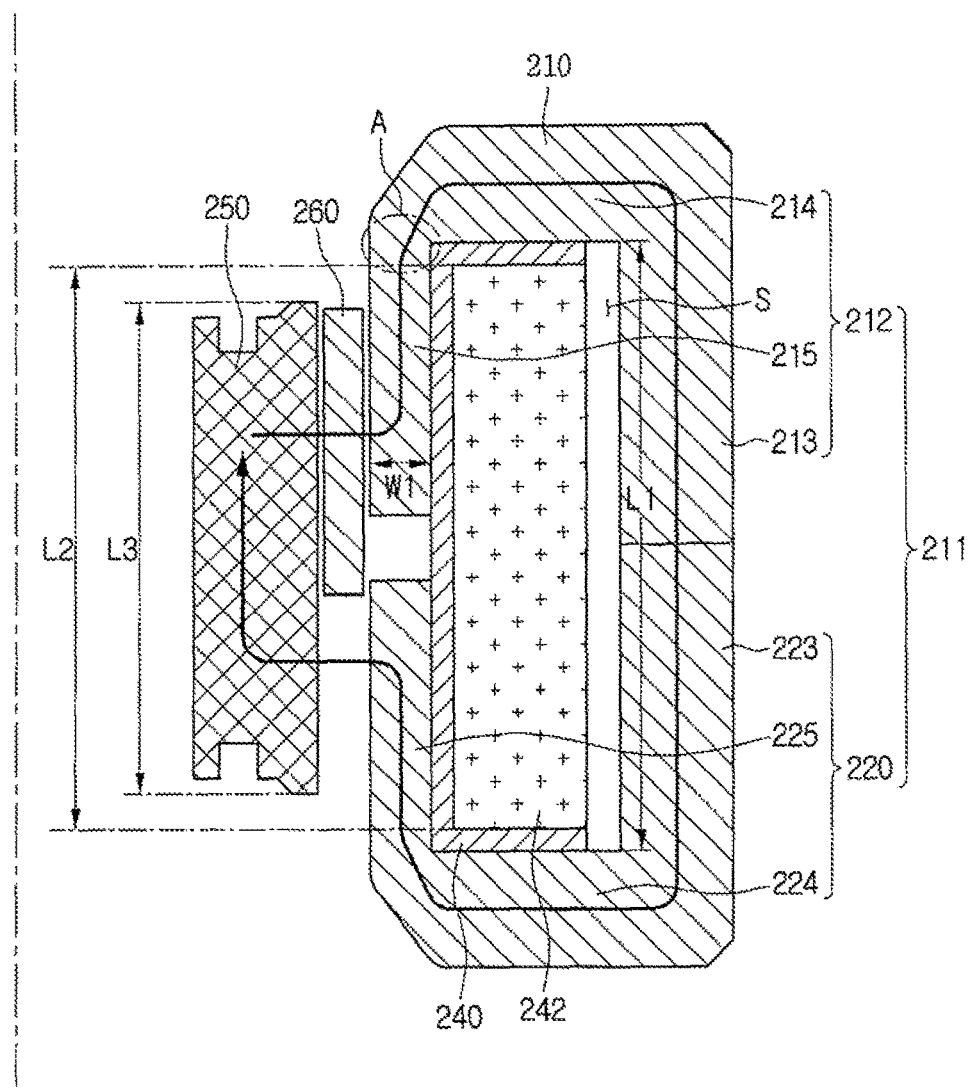
FIG. 3 is a schematic cross-sectional view of a linear motor according to an embodiment.

FIG. 3 is a schematic cross-sectional view of a linear motor according to an embodiment. Referring to FIG. 3, the first core block 212 may include a first core 213 that extends in a moving direction of the permanent magnet 260, that is, a direction substantially parallel to the axial direction, a second core 214 that extends from the first core 213 and disposed in a direction substantially perpendicular to the axial direction, and a first magnetic pole 215 that extends from the second core 214. The first magnetic pole 215 may be positioned between the second stator 250 and the coil 242.

The second core block 220 may include a first core 223 that extends in a moving direction of the permanent magnet 260, that is, a direction substantially parallel to the axial direction, a third core 224 that extends from the first core 223 and disposed in a direction substantially perpendicular to the axial direction, and a second magnetic pole 225 that extends from the third core 224. The second magnetic pole 225 may be positioned between the second stator 250 and the coil 242. The first and second magnetic poles 215 and 225 may extend from the second core 214 and the third core 224 in a direction so as to extend closer to each other and may be spaced apart from each other.

In the permanent magnet 260, when current is applied to the coil 242, magnetic flux may be formed in the coil 242 by the current flowing through the coil 242, and the magnetic flux may flow along the first stator 210 and the second stator 250 while forming a closed circuit. The first magnetic pole 215 may form any one of an N pole and an S pole, and the second magnetic pole 225 may form the other of the N pole and the S pole.

The permanent magnet 260 may linearly move in the axial direction between the first and second stators 210 and 250, by means of a mutually interactive force formed by a magnetic flux flowing along the first and second stators 210 and 150 and a magnetic flux formed by the permanent magnet 260. When the linear motor 200 operates normally, the permanent magnet 260 may linearly move within a range of a length L3 of a normal movement trajectory.

A magnetic path width W1, which may be a width of a path through which each magnetic flux of the first magnetic pole 215 and the second magnetic pole 225 moves, may be constant at least within the range of the length L3 of the normal movement trajectory of the permanent magnet 260. Also, the magnetic path width W1 of a portion with a constant width in each of the magnetic poles 215 and 225 may be smaller than a magnetic flux width (a horizontal direction width in the drawing) of the first cores 213 and 223, and a magnetic flux width (a vertical direction width in the drawing) of the second and third cores 214 and 224.

In each of the first and second magnetic poles 215 and 225, a sum of axial direction lengths of the portions with a constant width may be longer than the axial direction length of the permanent magnet 260. In the stator core 211, an axial direction length L1 of a space S, in which the coil winding assembly 240 and 242 may be positioned, may be longer than the length L3 of the normal movement trajectory of the permanent magnet 260. Further, in the stator core 211, the axial direction length L1 of the space S, in which the coil winding assembly 240 and 242 may be positioned, may be longer than the axial direction length of the second stator 250.

An axial direction length L2 of the coil 242 may be equal to or longer than the axial direction length of the second stator 250. The axial direction length L2 of the coil 242 may be equal to or longer than the length L3 of the normal movement trajectory of the permanent magnet 260.

Figure 4:
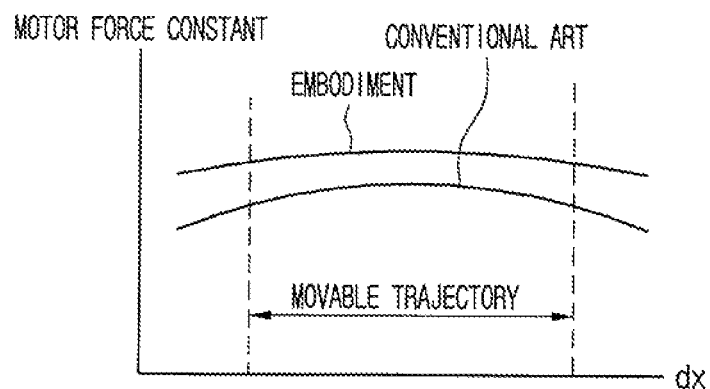
FIG. 4 is a graph illustrating a comparison of motor force constants in a stator core according to an embodiment and a conventional stator core.

FIG. 4 is a graph illustrating a comparison of motor force constants in a stator core according to an embodiment and a conventional stator core. Referring to FIGS. 3 and 4, according to structure of the stator core 211 of this embodiment, a portion in each of the magnetic poles 215 and 225 at which saturation may occur may be an outer region (A region) of the normal movement trajectory of the permanent magnet 260 in each of the magnetic poles 215 and 225. That is, a decrease in motor force constant may be minimized within the range of the normal movement trajectory of the permanent magnet 260.

Thus, according to embodiments, a slope of the motor force constant at a border portion of the normal movement trajectory of the permanent magnet 260 in each of the magnetic poles 215 and 225 may be decreased in comparison with the conventional art. Thus, motor efficiency may be improved.

Also, according to embodiments, the magnetic path width of each of the magnetic poles 215 and 225 may be made constant, but smaller than the magnetic path width of each of the first to third cores 213, 214, 223, and 224. Also, the axial direction length of the coil 242 may be made equal to or greater than the length L3 of the normal movement trajectory of the permanent magnet 260. Thus, an outer diameter of the linear motor 200 may be decreased, and even when the outer diameter of the linear motor 200 is decreased, a total sectional area of the coil 242 wound onto the bobbin 240 may be maintained to prevent a reduction in motor efficiency.

Also, as the magnetic path width of each of the poles 215 and 225 and the axial direction length of the coil 242 are adjusted, the total sectional area of the coil wound onto the bobbin 240 may be increased even when the outer diameter of the linear motor 200 is decreased. Thus, motor efficiency may be improved.

Also, according to embodiments, as the magnetic path widths of each of the poles 215 and 225 are uniform, a section of a space in the bobbin in which the coil may be wound may be allowed to have a rectangular shape. Thus, the coil may be easily wound onto the bobbin, thereby improving mass productivity.

Also, according to embodiments, as the shape of the first stator is changed, the outer diameter of the linear motor may be decreased. Thus, existing structures of a permanent magnet and a second stator may be used.

Figure 5:
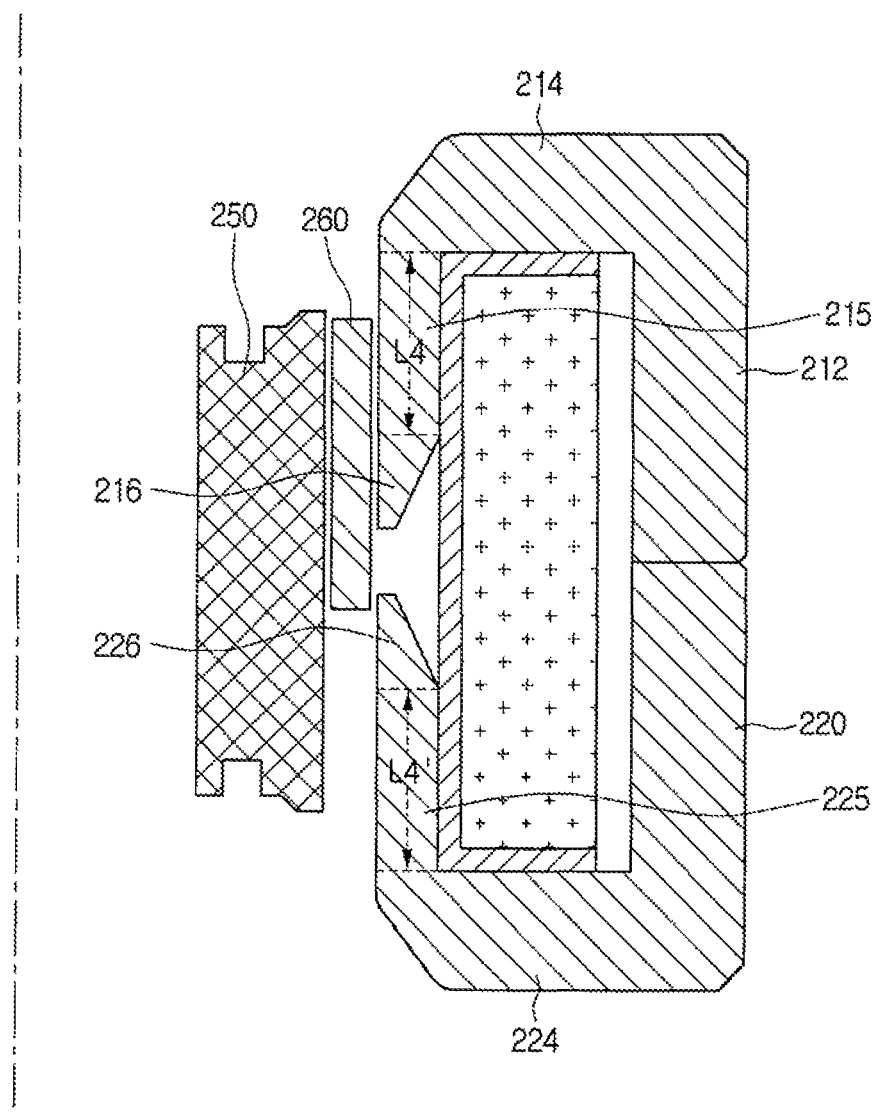
FIG. 5 is a schematic view illustrating a linear motor according to another embodiment.

FIG. 5 is a schematic view illustrating a linear motor according to another embodiment. This embodiment is the same as the previous embodiments except for shapes of the magnetic poles of the stator core. Accordingly, only characteristic parts according to this embodiment will be described, and repetitive disclosure has been omitted.

Referring to FIG. 5, the stator cores according to this embodiment may include first core block 212 and second core block 220. The first core block 212 may include first magnetic pole 215, and the second core block 220 may include second magnetic pole 225. At least a portion of the first and second magnetic poles 215 and 225 may have a constant magnetic path width. For example, in the first magnetic pole 215, at least a magnetic path width of a portion connected to the second core 214 of the first core block 212 may be constant. Also, in the second magnetic pole 225, at least a magnetic path width of a portion connected to the third core 224 of the second core block 224 may be constant. Also, the first magnetic pole 215 may include a first magnetic pole tip 216 having a decreasing magnetic path width, and the second magnetic pole 225 may include a second magnetic pole tip 226 having a decreasing magnetic path width.

A sum of a length L4 of a portion with a constant magnetic path width in the first magnetic pole 215 and a length L4 of a portion with a constant magnetic path width in the second magnetic pole 215 may be longer than an axial direction length of the permanent magnet 260. According to this embodiments, as a saturated portion in each of the magnetic poles 215 and 225 may also correspond to an outer region (A region) of the normal movement trajectory of the permanent magnet 260, the motor force constant may be minimally decreased at a border portion of the normal movement trajectory of the permanent magnet 260, and a slope thereof may be minimally increased.

Figure 6:
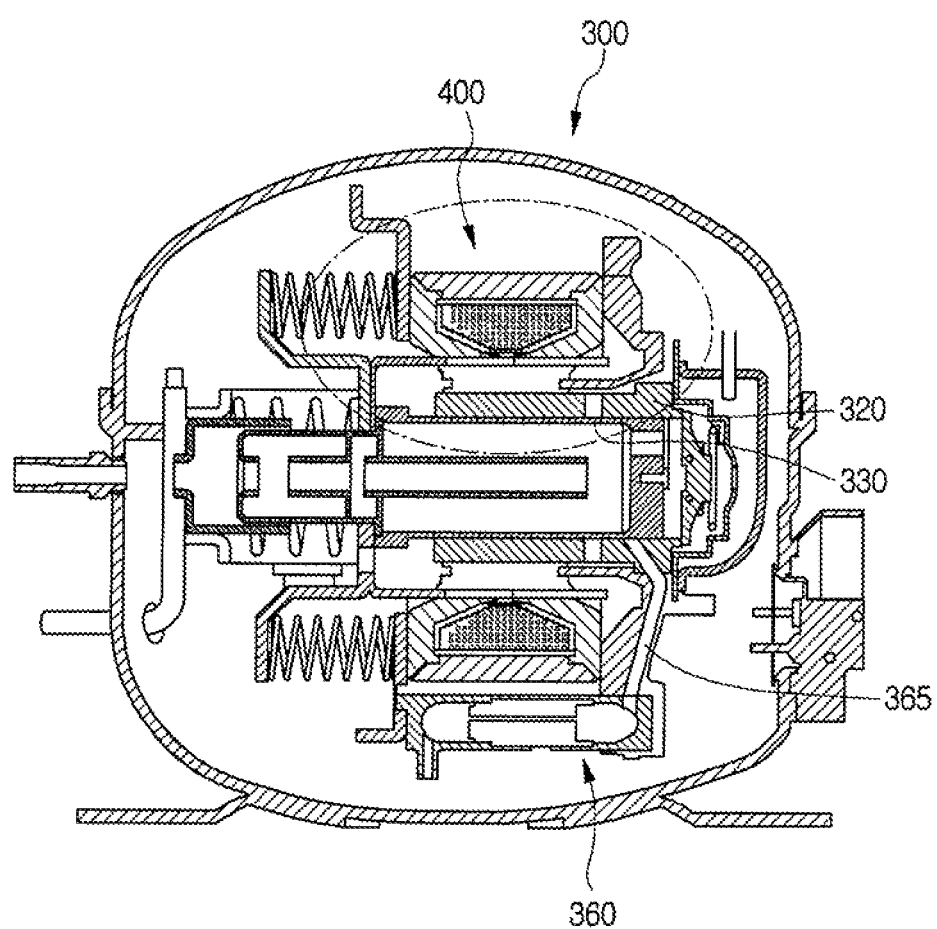
FIG. 6 is a cross-sectional view of a linear compressor according to still another embodiment.

FIG. 6 is a cross-sectional view of a linear compressor according to still another embodiment. The structure of the linear motor in this embodiment is the same as that in the previous embodiments except for a lubrication method between the piston and the cylinder. Accordingly, only characterized parts according to this embodiment will be described, and repetitive disclosure has been omitted.

Referring to FIG. 6, a linear compressor 300 according to this embodiment may include a cylinder 320, a piston 330, a linear motor 400, and an oil supply apparatus 360. A predetermined oil may be stored in a shell of the linear compressor 300. The oil supply apparatus 360 that pumps the oil may be disposed at a lower portion of the shell. The oil supply apparatus 360 may pump the oil upward by being operated by vibration generated as the piston 330 linearly reciprocates.

The linear compressor 300 may further include an oil supply tube 365 that guides an oil flow from the oil supply apparatus 360. The oil supply tube 365 may extend from the oil supply apparatus 360 to a space between the cylinder 320 and the piston 330. The oil pumped from the oil supply apparatus 360 may be supplied to a space between the cylinder 320 and the piston 330 through the oil supply tube 365, and perform functions of cooling and lubrication.

Embodiments disclosed herein provide a linear motor and a linear compressor, for which sizes thereof may be reduced, and deterioration in output and performance thereof may be prevented.

Embodiments disclosed herein provide a linear motor that may include a first stator; a second stator spaced apart from the first stator; and a permanent magnet disposed to be movable in a first direction between the first and second stators. The first stator may include a bobbin with a coil wound thereon, and a stator core that surrounds the bobbin. The stator core may be located between the second stator and the coil, and may include first and second magnetic poles spaced apart from each other. A portion or the entirety of each of the first and second magnetic poles may have a constant magnetic path width within a range of a moving trajectory of the permanent magnet.

Embodiments disclosed herein further provide a linear motor that may include a first stator; a second stator spaced apart from the first stator; and a permanent magnet disposed to be movable in a first direction between the first and second stators. The first stator may include a bobbin with a coil wound thereon, and a stator core that surrounds the bobbin, and a length of a space, at which the coil of the stator core may be located, in a first direction may be longer that a length of the second stator in the first direction.

Embodiments disclosed herein further provide a linear compressor that may include a cylinder; a piston capable of reciprocating in an axial direction inside of the cylinder; and a linear motor that provides power to the piston. The linear motor may include a first stator, a second stator spaced apart from the first stator, and a permanent magnet disposed to be movable in the axial direction between the first and second stators. The first stator may include a bobbin with a coil wound thereon, and a stator core that surrounds the bobbin.

The stator core may be located between the second stator and the coil, and may include first and second magnetic poles spaced apart from each other. One portion or the entirety of each of the first and second magnetic poles may have a constant magnetic path width within a range of a moving trajectory of the permanent magnet.

The details of one or more embodiments are set forth in the accompanying drawings and the description. Other features will be apparent from the description and drawings, and from the claims.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:
1. A linear motor, comprising:
a first stator;
a second stator spaced apart from the first stator; and
a permanent magnet disposed to be movable in a first direction between the first and second stators, wherein the first stator includes:
a bobbin with a coil wound thereon; and
a stator core that surrounds the bobbin, wherein a portion of the stator core is located between the second stator and the coil and includes first and second magnetic poles spaced apart from each other, wherein a magnetic path width of an entirety of each of the first and second magnetic poles is constant, and wherein a length of each of the first and second magnetic poles in a first direction is shorter than a length of the permanent magnet, and the length of each of the first and second magnetic poles in the first direction is greater than a half of the length of the second stator.

2. The linear motor according to claim 1, wherein the stator core includes a first core that extends in a direction substantially parallel to the first direction, a second core that extends in a direction that crosses the first direction, and a third core that extends in a direction that crosses the first direction, wherein the first magnetic pole extends from the second core, and the second magnetic pole extends from the third core, and wherein the magnetic path width of each of the first and second magnetic poles is smaller than a magnetic path width of each of the first to third cores.

3. The linear motor according to claim 2, wherein the first magnetic pole is connected to the second core and the second magnetic pole is connected to the third core.

4. The linear motor according to claim 1, wherein a length, in the first direction, of a space in the stator core in which the coil is located is longer than a length, in the first direction, of the second stator.

5. The linear motor according to claim 1, wherein a length, in the first direction, of a space in the stator core in which the coil is located is longer than a length of the movement trajectory of the permanent magnet.

6. The linear motor according to claim 1, wherein a sum of lengths, in the first direction, of the first and second magnetic poles is longer than a length of the permanent magnet in the first direction.

7. The linear motor according to claim 1, wherein a length of the coil in the first direction is equal to or longer than a length of the second stator in the first direction.

8. The linear motor according to claim 1, wherein a length of the coil in the first direction is equal to or longer than a length of the movement trajectory of the permanent magnet.

9. A linear compressor comprising the linear motor according to claim 1.

10. A linear motor, comprising:
a first stator;
a second stator spaced apart from the first stator; and
a permanent magnet disposed to be movable in a first direction between the first and second stators, wherein the first stator includes:
a bobbin with a coil wound thereon; and
a stator core that surrounds the bobbin and includes first and second magnetic poles spaced apart from each other, wherein a length of a space, in which the coil of the stator core is located, in the first direction is longer than a length of the second stator in the first direction, wherein a magnetic path width of an entirety of each of the first and second magnetic poles is constant, and wherein a length of each of the first and second magnetic poles in a first direction is greater than a half of a length of the second stator.

11. The linear motor according to claim 10, wherein a length of the coil in the first direction is longer than a length of the second stator in the first direction.

12. The linear motor according to claim 10, wherein a sum of lengths, in the first direction, of the first and second magnetic poles is longer than a length of the permanent magnet in the first direction.

13. A linear compressor comprising the linear motor according to claim 10.

14. A linear compressor, comprising:
a cylinder;
a piston capable of reciprocating in an axial direction inside of the cylinder; and
a linear motor that provides power to the piston, wherein the linear motor comprises:
a first stator;
a second stator spaced apart from the first stator; and
a permanent magnet disposed to be movable in a first direction between the first and second stators, wherein the first stator includes:
a bobbin with a coil wound thereon; and
a stator core that surrounds the bobbin, wherein the stator core is located between the second stator and the coil and includes first and second magnetic poles spaced apart from each other, wherein a magnetic path width of an entirey of each of the first and second magnetic poles is constant, and wherein a length of each of the first and second magnetic poles in a first direction is shorter than a length of the permanent magnet, and the length of each of the first and second magnetic poles in the first direction is greater than a half of the length of the second stator.

15. The linear compressor according to claim 14, wherein the stator core includes a first core that extends in a direction substantially parallel to the first direction, a second core that extends in a direction that crosses the first direction, and a third core that extends in a direction that crosses the first direction, wherein the first magnetic pole extends from the second core, and the second magnetic pole extends from the third core, and wherein the magnetic path width of each of the first and second magnetic poles is smaller than a magnetic path width of each of the first to third cores.

16. The linear compressor according to claim 14, wherein a length, in the first direction, of a space in the stator core in which the coil is located is longer than a length, in the first direction, of the second stator or a length of the movement trajectory of the permanent magnet.

17. The linear compressor according to claim 14, wherein a sum of lengths, in the first direction, the first and second magnetic poles is longer than a length of the permanent magnet in the first direction.

18. The linear compressor according to claim 14, wherein a length of the coil in the first direction is equal to or longer than a length of the second stator in the first direction or a length of the movement trajectory of the permanent magnet.

* * * * *